(12) United States Patent
Tatat

(10) Patent No.: US 7,646,954 B2
(45) Date of Patent: Jan. 12, 2010

(54) OPTICAL FIBER TELECOMMUNICATIONS CABLE

(75) Inventor: Olivier Tatat, Sangatte (FR)

(73) Assignee: Draka Comteq, B.V., Amsterdam (NL)

( * ) Notice: Subject to any disclaimer, the term of this patent is extended or adjusted under 35 U.S.C. 154(b) by 30 days.

(21) Appl. No.: 11/835,708

(22) Filed: Aug. 8, 2007

(65) Prior Publication Data

US 2008/0037942 A1   Feb. 14, 2008

(30) Foreign Application Priority Data

Aug. 8, 2006 (FR) .................................. 06 07219

(51) Int. Cl.
G02B 6/44 (2006.01)
(52) U.S. Cl. ...................... 385/113; 385/103
(58) Field of Classification Search ................. 385/103, 385/113, 114
See application file for complete search history.

(56) References Cited

U.S. PATENT DOCUMENTS

| | | |
|---|---|---|
| 4,844,575 A | 7/1989 | Kinard et al. |
| 5,050,957 A | 9/1991 | Hamilton et al. |
| 5,109,457 A | 4/1992 | Panuska et al. |
| 5,155,789 A | 10/1992 | Le Noane et al. |
| 5,319,730 A | 6/1994 | Rasanen et al. |
| 5,671,312 A | 9/1997 | Jamet |
| 6,041,153 A | 3/2000 | Yang |
| 6,377,738 B1 | 4/2002 | Anderson et al. |
| 6,546,176 B2 | 4/2003 | Anderson et al. |
| 7,184,634 B2 * | 2/2007 | Hurley et al. ............... 385/113 |
| 2002/0126970 A1* | 9/2002 | Anderson et al. ........... 385/113 |
| 2003/0165309 A1 | 9/2003 | Moon et al. |
| 2004/0114889 A1 | 6/2004 | Lee |
| 2008/0037942 A1 | 2/2008 | Tatat |

FOREIGN PATENT DOCUMENTS

| | | |
|---|---|---|
| EP | 0968809 A | 1/2000 |
| EP | 1006385 A | 6/2000 |
| EP | 1343040 A | 9/2003 |
| EP | 1887396 A1 | 2/2008 |
| FR | 2665266 A1 | 12/1994 |
| FR | 2706218 A1 | 12/1994 |
| WO | 92/01962 A1 | 2/1992 |
| WO | 2006/034722 A1 | 6/2006 |
| WO | 2006/034723 A1 | 6/2006 |

OTHER PUBLICATIONS

French Search Report and Written Opinion for Counterpart French Application No. 06/07219, completed on Apr. 19, 2007.
Extended European Search Report in corresponding European Application Serial No. 07015345, dated Dec. 3, 2007.

* cited by examiner

*Primary Examiner*—Jerry T Rahll
(74) *Attorney, Agent, or Firm*—Summa, Additon & Ashe, P.A.

(57) ABSTRACT

An optical fiber telecommunications cable includes micromodules positioned with a longitudinal central cavity formed by a jacket. Two strength members are arranged longitudinally in the jacket and define a bending axis of the cable. Each strength member has an elongated oval cross-sectional shape with a height perpendicular to the bending axis and a width parallel to the bending axis. The height-to-width ratio of each strength member is more than one and no more than two. The optical fiber telecommunications cable has a reduced diameter and good robustness, and can be manufactured at lower cost.

22 Claims, 2 Drawing Sheets invention**

OPTICAL FIBER TELECOMMUNICATIONS CABLE

CROSS-REFERENCE TO PRIORITY APPLICATION

This application hereby claims the benefit of pending French Application No. 06/07219 (filed Aug. 8, 2006, at the French Patent Office), which is hereby incorporated by reference in its entirety.

FIELD OF THE INVENTION

The present invention relates to optical fiber telecommunications cables and, more particularly, to cables in which optical fibers are grouped together to form a plurality of micromodules.

BACKGROUND OF THE INVENTION

Optical fiber telecommunications cables are generally intended to be laid in ducts of urban or long-haul transmission systems. To facilitate its positioning within a duct, a telecommunications cable must have a certain robustness to withstand the traction and the mechanical stresses of installation, as well as a certain flexibility in at least one bending direction. In addition, a telecommunications cable must generally be able to withstand conditions of use over a wide temperature range, possibly between −40° C. to +60° C., which may cause expansions and compressions in the cable jacket. It is known to supplement the telecommunications cable with strength members, which absorb the mechanical stresses and thereby protect the optical fibers arranged in the cable. Strength members may be positioned in the central area of the cable or on its periphery.

For example, International Publication No. WO 2006/034722 and International Publication No. WO 2006/034723 describe cables with micromodules having two circular strength members located longitudinally in the cable jacket surrounding the micromodules.

U.S. Pat. No. 5,050,957 describes an optical fiber cable in which optical fibers are placed in a tubular element filled with a filler composition. A jacket surrounds the tubular element and strength members are arranged in the jacket against the tubular element. In one of the examples of this document, the strength members follow the outer periphery of the tubular element. The cable described in this patent, however, is not a cable with micromodules.

U.S. Pat. No. 5,109,457 and U.S. Pat. No. 4,844,575 each describe an optical fiber cable including bundles of fibers assembled and placed in a tubular element filled with a filler composition. A jacket surrounds the tubular element and circular strength members are arranged in the jacket against the tubular element.

International Publication No. WO 92/01962 describes an optical fiber cable comprising at least one so-called package of optical fiber ribbons and at least one reinforcing member.

U.S. Pat. No. 5,155,789 (and its counterpart French Patent Publication 2,706,218) and U.S. Pat. No. 5,671,312 (and its counterpart French Patent Publication 2,665,266) disclose optical fiber cables that include several micromodules of optical fibers, wherein each optical fiber micromodule is enveloped by a retaining jacket enclosing several fibers.

There remains, however, a need for an optical fiber telecommunications cable that possesses a reduced diameter, as well as satisfactory robustness and water-blocking properties, and yet can be manufactured at lower cost than conventional telecommunications cables.

SUMMARY OF THE INVENTION

For this purpose, the invention proposes using two strength members arranged longitudinally in the jacket and lying diametrically opposite on either side of the cable cavity containing the micromodules. In particular, these strength members possess an elongated cross-section, which provides a large cross-sectional area despite a lesser thickness.

More particularly, the invention proposes an optical fiber telecommunications cable that includes (i) a longitudinal central cavity to receive micromodules grouping optical fibers together; (ii) a jacket surrounding the central cavity; (iii) and two strength members arranged longitudinally in the jacket and defining a cable bending axis that passes through the two strength members. Each strength member has an elongated shape in its cross section with a height perpendicular to the bending axis and a width parallel to the bending axis. The height-to-width ratio of each strength member is more than 1 and less than about 2.

The strength member according to the present invention possesses a non-circular shape (e.g., an oval shape, a racetrack shape, or a rectangle bordered by two half-discs). In contrast, the cable's central cavity is substantially circular.

Each strength member is typically positioned from both the outer periphery of the jacket and the inner periphery of the jacket by at least 0.3 millimeter (e.g., 0.4 to 0.7 millimeter).

The height-to-width ratio of each strength member is usually between 1.5 and 1.75.

The height of the strength members is less than the diameter of the central cavity. Indeed, the height of the strength members is typically between 0.1 and 0.5 times (i.e., 10-50 percent), and more typically between 0.3 and 0.4 times (i.e., 30-40 percent), the diameter of the central cavity.

The strength members are typically made from a material or composite having an axial compression modulus of 40,000 MPa or more and/or a thermal expansion coefficient of $5 \times 10^{-5}$ $K^{-1}$ or less.

Other advantages and features of the invention will become apparent upon reading the following description of non-limiting invention embodiments, which are provided by way of example and with reference to the appended drawings.

DETAILED DESCRIPTION

In one aspect, the present invention embraces a telecommunications cable that includes non-circular, elongated strength members. The telecommunications cable possesses a reduced total diameter yet provides improved robustness and water-blocking properties. Moreover, the cable design according to the present invention yields reduced manufacturing costs.

Figure 1:
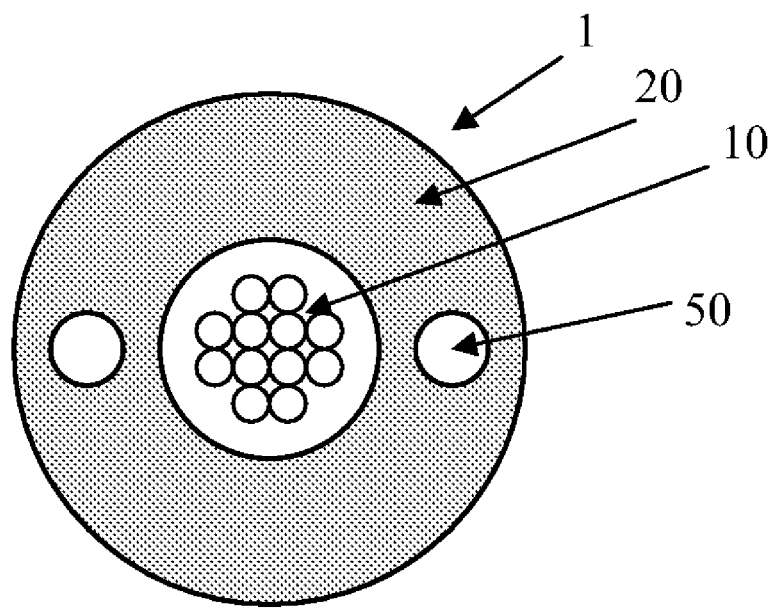
FIG. 1 depicts a cross-sectional view of a conventional cable.
Figure 2:
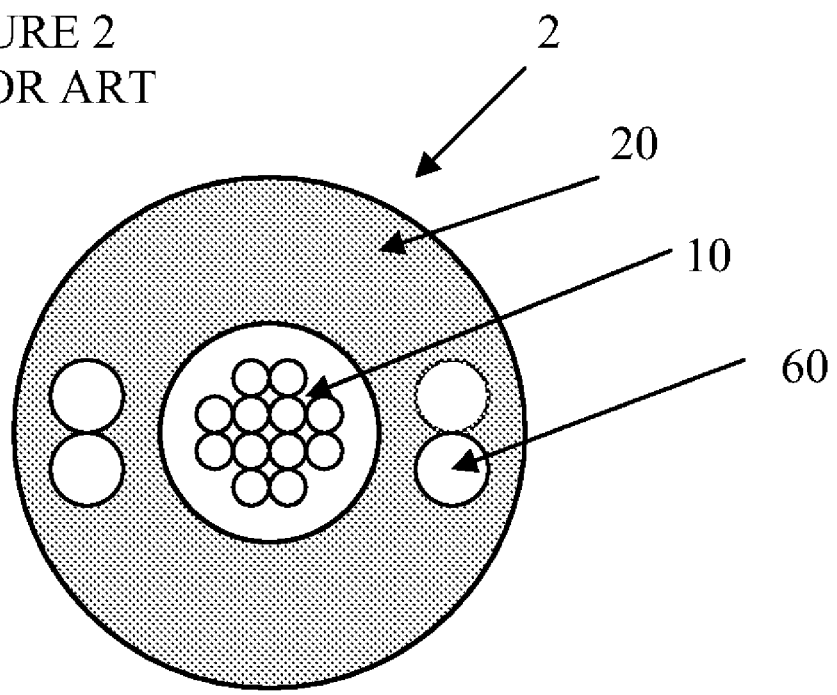
FIG. 2 depicts a cross-sectional view of another conventional cable.

By way of introduction and as noted, FIGS. 1 and 2 depict conventional telecommunications cables.

FIG. 1, for example, depicts a conventional telecommunications cable 1 having micromodules 10. The micromodules 10 are arranged in a central cavity of the cable 1. A jacket 20 surrounds the central cavity receiving the micromodules 10. Although not illustrated in detail in FIG. 1, each micromodule 10 contains several optical fibers grouped together within the thin, flexible retaining jacket 20.

The jacket 20 of cable 1, however, contains strength members 50 of a circular shape.

As illustrated in FIG. 1, the circular strength members 50 are generally arranged in the jacket 20 longitudinally, lying opposite either side of the cavity containing the micromodules 10. The circular strength members 50 are employed to limit cable deformations due to pulling forces (e.g., when laying the cable in a duct) and to limit axial contraction and expansion deformations of the cable 1 when it is subjected to major temperature variations by offsetting jacket-induced compression or expansion forces.

The telecommunications cable depicted in FIG. 1, however, possesses a relatively large diameter. In this regard, those having ordinary skill in the art will appreciate that size of the cable 1 depends inter alia on the size of the strength members 50 that are integrated in the jacket 20.

The thicker the jacket 20, the greater are the expansion and compression forces caused by temperature variations (i.e., the jacket material is particularly sensitive to temperature variations). Therefore, it is desirable to limit the diameter of the strength members 50 used to reinforce the cable jacket 20 in order to limit the quantity of jacket 20 used. This, in turn, reduces the diameter of the cable 1 and its manufacturing costs. Constraining the diameter of the strength members 50 must not lead to faulty compensation of mechanical and heat stresses caused by thermal compression and thermal expansion that the cable 1 may undergo when in use.

FIG. 2 depicts an alternative telecommunications cable 2 that effectively replaces each strength member 50 shown in FIG. 1 by two smaller, adjacent circular strength members 60. This solution was applied in a cable marketed by the SAGEM Company under the trade name µGAINE® cable.

As shown in FIG. 2, each pair of circular strength members 60 has substantially the same cross-sectional area as the larger strength member 50 in FIG. 1, but with a smaller jacket thickness and hence a smaller cable diameter. Although this cable design makes it possible to limit the amount of jacket 20 used in the cable 2, the manufacturing cost of the cable 2 is relatively expensive because two strength members 60 of smaller diameter cost more than a single strength member 50 of larger diameter.

In addition, it is difficult to insert the jacket material between each pair of circular strength members 60. The resulting gap between a pair of two circular strength members 60 can provide an undesirable pathway for water to find its way through the cable (e.g., perhaps as far as a splicing box).

In contrast and as herein described, the cable of the present invention provides improvements over the telecommunications cables depicted in FIGS. 1 and 2. In this regard and with reference to FIG. 3, cable 3 has a longitudinal central cavity that receives micromodules 10 grouping together optical fibers (not shown), and a jacket 20 surrounding (i.e., defining) this central cavity. The micromodules 10, which might contain approximately 2 to 15 optical fibers, are loosely provided within the cavity. The retaining jackets of the micromodules 10 and the coatings of the optical fibers may be colored to facilitate the identification of fibers in the cable 10, such as during splicing operations.

The jacket 20 of cable 3 may be polymeric, such as polyethylene having a density in the range of 0.92 to 0.96 kg/m³.

The jacket 20 is typically formed of a material that is resistant to humidity but mechanically less rigid and somewhat sensitive to temperature variations (i.e., the jacket 20 has good resistance to humidity and flexibility).

Figure 3:
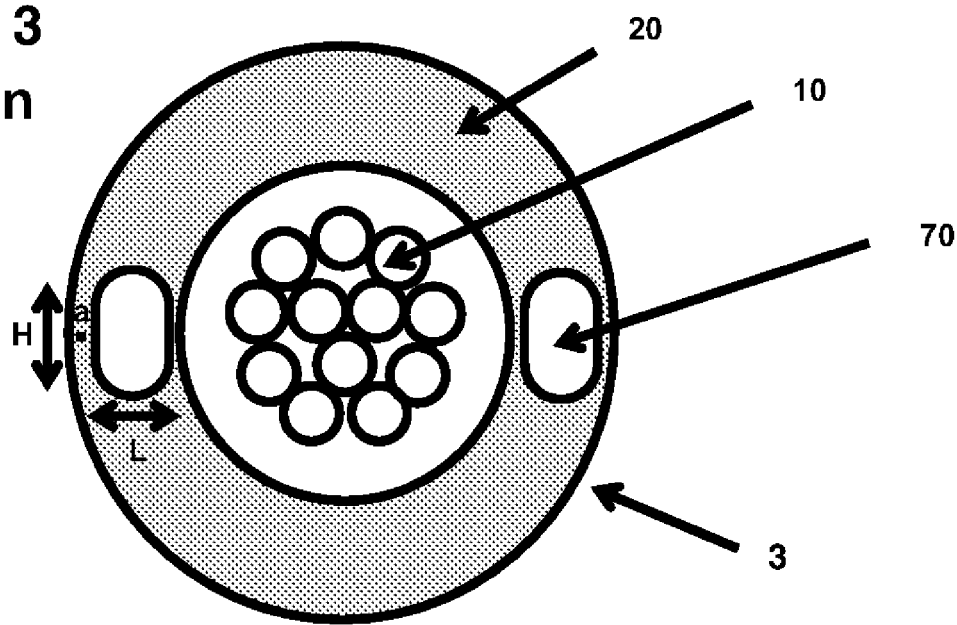
FIG. 3 depicts a cross-sectional view of an exemplary cable according to one embodiment of the present invention.

The jacket 20 can be extruded in line during the formation of the cable 3 as the fibers are grouped together in micromodules 10. As depicted in FIG. 3 (i.e., the cross-sectional view of the cable 3), the jacket 20 has an inner periphery and an outer periphery (i.e., defined radially).

The cable 3 according to the present invention further includes two non-circular strength members 70 arranged longitudinally in the jacket 20. These strength members 70 may be glass-reinforced plastic rods, known as GRP (glass reinforced plastic), steel rods, or aramid-reinforced plastic rods, or any other suitable longitudinal strength member to rigidify a telecommunications cable. In particular, the strength members 70 may be formed of any material or composite having a high tensile modulus and a high axial compression modulus of 40,000 MPa or more, as well as a low coefficient of thermal expansion of $5 \times 10^{-5}$ $K^{-1}$ or less. A high axial compression modulus is desirable because at low temperatures the strength members 70 help to prevent the cable 3 from contracting and buckling, which can increase attenuation.

The polymers making up the cable jacket 20 contract significantly upon cooling. This leads to a high axial compression load on the strength members 70. A low coefficient of thermal expansion is desirable because the strength members 70 are intended to prevent negative effects on the transmission characteristics of the optical fibers in the cable 3 upon temperature changes. These strength members 70 are the stable factor in the cable 3 regardless of the temperature.

As illustrated in FIG. 3, the strength members 70 of the cable 3 according to the present invention are positioned in the jacket 20. The strength members must not be positioned too near the micromodules 10 so as to avert the inducement of mechanical stresses in the micromodules 10 and optical fibers. Moreover, the strength members 70 must not be positioned too close to the outer periphery of the jacket 20 to avoid their damage and to ensure a good coefficient of friction when installing (e.g., pulling) the cable 3. In particular, the strength members 70 are positioned from the outer periphery of the jacket 20 by at least 0.3 millimeter (e.g., about 0.5 millimeter or more) and from the inner periphery of the jacket 20 by at least 0.3 millimeter (e.g., 0.5 millimeter or more). This spacing typically allows for sufficient shielding from induced stresses.

FIG. 3 shows the strength members 70 arranged diametrically opposite on either side of the central cavity receiving the micromodules 10. This arrangement of the strength members 70 helps to define a preferential bending plane of the cable 3 to facilitate installation into a telecommunications system ducts. Stated otherwise, a typical bending axis of the cable 3 is defined perpendicular to the longitudinal direction of the cable and passing through the two strength members 70. The cable 3 can therefore be inserted into ducts of a telecommunications system and pulled along these ducts being bent along its bending axis whenever necessary.

Depending on applications, another relative arrangement of the strength members 70 is within the scope of the present invention. In particular, the strength members 70 may be slightly off-axis with respect to a cable diameter while facilitating the definition of a preferred bending axis.

As illustrated in FIG. 3, each strength member 70 in its cross-section has a substantially oval or flattened or elongate shape with a height H perpendicular to the bending axis and a width L parallel to the bending axis. The height-to-width ratio H/L of each strength member 70 is greater than 1 and is typically greater than 1.5 in order to yield significant savings in jacket material usage. This ratio must also be limited to maintain the possibility of bending the cable along its bending axis. Typically, the height-to-width ratio H/L is 2 or less, typically less than 1.75. A height-to-width ratio between 1 and 2 (e.g., between about 1.5 to 1.75) will facilitate the bending of the cable 3 around the axis passing through the two strength members 70, with a target being to bend the cable over 20 times its diameter (i.e., bending radius).

The height of each strength member 70 is typically less than the cavity diameter. It is desirable that the height of the strength member 70 is about 0.1 to 0.5 times the diameter of the central cavity, typically between 0.3 and 0.4 times the diameter of the central cavity. If the height of the central strength member 70 is less than 0.1 times the diameter of the central cavity, the strength supplied by the strength member 70 is less than desired. If the ratio is over 0.5 times the diameter of the central cavity, the bending radius of the cable is less than the desired value of twenty times the cable diameter.

A preferred direction of bending must be maintained in the cable 3 to facilitate its installation. However, if the height H of the strength members 70 becomes too great, the cable 3 will be difficult to bend; the strength members 70, which precisely withstand traction and compression, will extend too far beyond the neutral plane containing the bending axis. By way of illustration, if the height H of the strength members 70 is too high, the cable 3 might have to be forced so that it will bend, which in turn could cause the breaking of a strength member 70 and/or tearing of the jacket 20.

In accordance with the foregoing, the shape of the strength members 70 may be such that the height over width ratio (H/L) falls between 1.5 and 1.75.

According to the present invention, the cross-sectional area of the strength members 70 is comparable (e.g., equivalent) to that of a conventional round strength member 50. By employing a sufficiently small width, however, the thickness of the jacket 20 is limited, thus reducing the diameter of the cable 3 as compared with the conventional cable 1 depicted in FIG. 1. This, of course, reduces cable manufacturing costs.

It is conventionally required by equipment manufacturers that a telecommunications cable be able to withstand a bending of at least twenty times its diameter (i.e., bending radius). For example, for GRP strength members 70, manufacturer specifications indicate a bend limit corresponding to a 2 percent elongation of the stretched strength member 70 at ambient temperature over a short period of time, and a 1 percent elongation at higher temperatures over a longer period of time. These constraints can be used as basis to calculate precise values of width L and height H of the strength members 70 for a given cable 3.

Comparative Table 1 (below) provides data with respect to three existing cables 1 (Cable A, Cable B, and Cable C) of the kind depicted in FIG. 1:

TABLE 1

| Prior art cables | Cable A | Cable B | Cable C |
| --- | --- | --- | --- |
| Inner jacket diameter (mm) | 5.9 | 7.3 | 8.5 |
| Outer jacket thickness at strength member (mm)* | 0.5 | 0.5 | 0.5 |
| Diameter of circular strength member (mm) | 1.8 | 2.1 | 2.5 |
| Cross-sectional area of strength member ($CSA_{sm}$) | 2.54 | 3.46 | 4.91 |
| Total cable diameter (mm) | 11.5 | 13.5 | 15.5 |

Table 2 (below), in contrast, provides three examples of a cable 3 according to the present invention (Example 1, Example 2, and Example 3) and of the kind depicted in FIG. 3:

TABLE 2

| Cables of the invention | Ex. 1 | Ex. 2 | Ex. 3 |
| --- | --- | --- | --- |
| Inner jacket diameter (mm) | 5.9 | 7.3 | 8.5 |
| Outer jacket thickness at strength member (mm)* | 0.5 | 0.5 | 0.5 |
| Width of strength member (mm) | 1.32 | 1.53 | 1.89 |
| Height of strength member (mm) | 2.21 | 2.59 | 3.00 |
| Height-to-width ratio (H/L) | 1.68 | 1.70 | 1.59 |
| Cross-sectional area of strength member ($CSA_{sm}$) | 2.54 | 3.46 | 4.90 |
| Total cable diameter (mm) | 10.54 | 12.36 | 14.29 |
| Quantity of jacket material saved (kg/km) | 16.66 | 23.23 | 28.42 |

*distance between the periphery of the strength member (close to the jacket) and the outer periphery of the jacket along the bending axis of the cable.

Table 1 and Table 2 indicate that the cable 3 according to the present invention has a reduced total cable diameter for the same size of inner cavity (i.e., for receiving micromodules 10) yet retains equivalent cross-sectional area for the strength members 70 and maintains a bend diameter equivalent to twenty times the cable diameter. As indicated in Table 2, the cable-diameter reduction saves jacket material, thereby reducing manufacturing costs.

It is further within the scope of the present invention to further reduce the cross-sectional area of the non-circular strength members 70 (i.e., relative to the cross-sectional area of the circular strength members 50 illustrated FIG. 1). By reducing the quantity of jacket 20 required to surround the cable 3, the thermal contraction and expansion forces are likewise reduced. In this way, the size (and thus cost) of the strength members 70 can also be reduced (i.e., providing additional manufacturing and performance efficiencies).

A robustness ratio of a cable can be defined as the ratio of the cross-sectional area of the strength elements (i.e., strength members) over the cross-sectional area of the surrounding jacket. The higher this robustness ratio, the more the cable is able to withstand mechanical and heat stresses. Accordingly, given equivalent strength-member cross-sectional areas, the cable 3 of the present invention has a higher robustness ratio (i.e., a lesser jacket cross-sectional area) than the more conventional telecommunications cables 1 and 2 depicted in FIGS. 1 and 2, respectively.

With respect to the examples set forth in Tables 1 and 2, the robustness ratio is improved by about 30 percent or more in the Example 1, Example 2, and Example 3 telecommunications cables.

The cross-section area of each elongated strength member 70 can be approximated by a rectangle bordered by two half-discs (i.e., a rectangle of size L×(H−L) with two half-discs of diameter L placed adjacent either side) The cross-sectional area (CSA) of each strength member 70 can then be expressed as follows:

$$CSA_{sm} = L \times (H - L) + \frac{\pi}{4}(L^2)$$

Likewise, the cross-sectional area (CSA) of the surrounding jacket 20 having an outer diameter De and an inner diameter Di can be expressed as follows:

$$CSA_{jacket} = \frac{\pi}{4}(De^2 - Di^2) - 2CSA_{sm}$$

Accordingly, the aforementioned robustness ratio is thus defined by the following relationship in which $CSA_{SM}$ represents the total cross-sectional area of the strength members 70):

$$\frac{CSA_{sm}}{CSA_{jacket}}$$

As noted, the cables 3 according to the present invention possess improved robustness as compared with conventional cables 1. See Tables 1 and 2 (above).

The relationship between the robustness ratio and the jacket thickness/cable diameter ratio will depend upon the kind of strength member 70 used (steel or GRP), the distance of the strength members 70 from the outer periphery of the jacket 20, and the diameter of an equivalent circular strength member 50.

The robustness ratio must not be excessive if it is wished to obtain a stable structure at low temperatures. This is facilitated through the use of strength members 70 having an elongated cross section as the jacket 20 cross section becomes proportionally lower.

In the specification and the figures, typical embodiments of the invention have been disclosed. Specific terms have been used only in a generic and descriptive sense, and not for purposes of limitation. The scope of the invention is set forth in the following claims.

The invention claimed is:

1. An optical fiber telecommunications cable (3), comprising:
   a longitudinal central cavity receiving micromodules (10) grouping optical fibers together;
   a jacket (20) surrounding the central cavity; and
   two strength members (70) arranged longitudinally in the jacket (20) and defining a bending axis of the cable (3) such that the bending axis passes through the two strength members (70), each strength member (70) having an elongated shape in its cross section with a height (H) perpendicular to the bending axis and a width (L) parallel to the bending axis, the height over width ratio (H/L) of each strength member (70) being more than 1 and no more than 2, wherein the two strength members (70) are non-diametrically positioned in the jacket (20) and wherein the strength members (70) are made from material or composite having an axial compression modulus greater than about 40,000 MPa.

2. The telecommunications cable (3) according to claim 1, wherein the height over width ratio (H/L) of each strength member (70) is between 1.5 and 1.75.

3. The telecommunications cable (3) according to claim 1, wherein each strength member (70) is positioned at least 0.3 millimeter from the outer periphery of the jacket (20) and from the inner periphery of the jacket (20).

4. The telecommunications cable (1) according to claim 1, wherein the strength members (70) are made from material or composite having a thermal expansion coefficient less than about $5 \times 10^{-5}$ $K^{-1}$.

5. The telecommunications cable (3) according to claim 1, wherein the height (H) of the strength members (70) is less than the diameter of the central cavity.

6. The telecommunications cable (3) according to claim 5, wherein the height (H) of the strength members (70) is between 0.1 and 0.5 times the diameter of the central cavity.

7. The telecommunications cable (3) according to claim 6, wherein the height (H) of the strength members (70) is between 0.3 and 0.4 times the diameter of the central cavity.

8. An optical fiber cable (3), comprising:
   a polymeric jacket (20) defining a longitudinal central cavity;
   one or more micromodules (10) positioned within the longitudinal central cavity, at least one of the micromodules (10) surrounding a plurality of optical fibers; and
   two strength members (70) longitudinally and non-diametrically positioned within the polymeric jacket (20) to define a bending axis;
   wherein each strength member (70) has a non-circular, elongated cross section having a height (H) that is substantially perpendicular to the bending axis and a width (L) that is substantially parallel to the bending axis;
   wherein each strength member (70) possesses a height-to-width ratio (H/L) of more than 1 and less than about 2; and
   wherein each strength member (70) has an axial compression modulus greater than about 40,000 MPa and a thermal expansion coefficient less than about $5 \times 10^{-5}$ $K^{-1}$.

9. An optical fiber cable (3) according to claim 8, wherein each strength member (70) is positioned at least 0.4 millimeter from the inner periphery of the polymeric jacket (20).

10. An optical fiber cable (3) according to claim 8, wherein each strength member (70) is positioned at least 0.4 millimeter from the outer periphery of the polymeric jacket (20).

11. An optical fiber cable (3) according to claim 8, wherein each strength member (70) is positioned at least 0.3 millimeter from both the inner periphery and the outer periphery of the polymeric jacket (20).

12. An optical fiber cable (3) according to claim 8, wherein:
   the polymeric jacket (20) defines a longitudinal central cavity having a substantially circular cross-section; and
   the height (H) of each strength member (70) is less than the cross-sectional diameter of the longitudinal central cavity.

13. An optical fiber cable (3) according to claim 12, wherein the height (H) of each strength member (70) is between about 10 percent and 50 percent of the cross-sectional diameter of the longitudinal central cavity.

14. An optical fiber cable (3) according to claim 12, wherein the height (H) of each strength member (70) is between about 30 percent and 40 percent of the cross-sectional diameter of the longitudinal central cavity.

15. An optical fiber cable (3) according to claim 11, wherein each strength member (70) possesses a height-to-width ratio (H/L) of between about 1.5 and 1.75.

16. An optical fiber telecommunications cable (3), comprising:
   a longitudinal central cavity receiving micromodules (10) grouping optical fibers together;
   a jacket (20) surrounding the central cavity; and
   two strength members (70) arranged longitudinally in the jacket (20) and positioned non-diametrically in the jacket (20), the strength members (70) defining a bending axis of the cable (3) such that the bending axis passes through the two strength members (70), each strength member (70) having an elongated shape in its cross section with a height (H) perpendicular to the bending axis and a width (L) parallel to the bending axis, the height over width ratio (H/L) of each strength member (70) being more than 1 and no more than 2.

17. The telecommunications cable (3) according to claim 16, wherein the height (H) of the strength members (70) is less than the diameter of the central cavity.

18. The telecommunications cable (3) according to claim 17, wherein the height (H) of the strength members (70) is between 0.1 and 0.5 times the diameter of the central cavity.

19. The telecommunications cable (3) according to claim 17, wherein the height (H) of the strength members (70) is between 0.3 and 0.4 times the diameter of the central cavity.

20. The telecommunications cable (3) according to claim 16, wherein the height over width ratio (H/L) of each strength member (70) is between 1.5 and 1.75.

21. The telecommunications cable (3) according to claim 16, wherein each strength member (70) is positioned at least 0.3 millimeter from the outer periphery of the jacket (20) and from the inner periphery of the jacket (20).

22. The telecommunications cable (1) according to claim 16, wherein the strength members (70) are made from material or composite having a thermal expansion coefficient less than about $5 \times 10^{-5}$ $K^{-1}$.

* * * * *

UNITED STATES PATENT AND TRADEMARK OFFICE
CERTIFICATE OF CORRECTION

PATENT NO.         : 7,646,954 B2
APPLICATION NO.    : 11/835708
DATED              : January 12, 2010
INVENTOR(S)        : Olivier Tatat Page 1 of 1

It is certified that error appears in the above-identified patent and that said Letters Patent is hereby corrected as shown below:

Claim 7, Column 8, Line 1 reads "The telecommunications cable (3) according to ~~claim 6~~"
and should read "The telecommunications cable (3) according to claim 5"

Claim 8, Column 8, Line 22 reads "mal expansion coefficient less than about ~~$5 \times 10^{-5} K^{-1}$~~."
and should read "mal expansion coefficient less than about $5 \times 10^{-5} K^{-1}$."

Claim 15, Colum 8, Line 47 reads "An optical fiber cable (3) according to ~~claim 11~~,"
and should read "An optical fiber cable (3) according to claim 8,"

Signed and Sealed this

Twenty-fourth Day of August, 2010

David J. Kappos
*Director of the United States Patent and Trademark Office*

UNITED STATES PATENT AND TRADEMARK OFFICE
CERTIFICATE OF CORRECTION

PATENT NO. : 7,646,954 B2
APPLICATION NO. : 11/835708
DATED : January 12, 2010
INVENTOR(S) : Olivier Tatat It is certified that error appears in the above-identified patent and that said Letters Patent is hereby corrected as shown below:

Claim 7, Column 8, Line 1 reads "The telecommunications cable (3) according to ~~claim 6~~"
and should read "The telecommunications cable (3) according to claim 5"

Claim 8, Column 8, Line 22 reads "mal expansion coefficient less than about ~~$5 \times 10^{-5} K^{-1}$~~."
and should read "mal expansion coefficient less than about $5 \times 10^{-5} K^{-1}$."

Claim 15, Column 8, Line 47 reads "An optical fiber cable (3) according to ~~claim 11~~,"
and should read "An optical fiber cable (3) according to claim 8,"

This certificate supersedes the Certificate of Correction issued August 24, 2010.

Signed and Sealed this

Fourteenth Day of December, 2010

David J. Kappos
*Director of the United States Patent and Trademark Office*